US008027912B1

(12) United States Patent
Thomas

(10) Patent No.: US 8,027,912 B1
(45) Date of Patent: Sep. 27, 2011

(54) SYSTEM AND METHOD FOR MERCHANT RISK MANAGEMENT

(75) Inventor: Larry J. Thomas, Thousand Oaks, CA (US)

(73) Assignee: Intuit Inc., Mountain View, CA (US)

( * ) Notice: Subject to any disclaimer, the term of this patent is extended or adjusted under 35 U.S.C. 154(b) by 228 days.

(21) Appl. No.: 12/433,745

(22) Filed: Apr. 30, 2009

(51) Int. Cl.
*G06Q 40/00* (2006.01)
(52) U.S. Cl. .............................................. 705/38; 705/30
(58) Field of Classification Search ............... 705/10–44
See application file for complete search history.

(56) References Cited

U.S. PATENT DOCUMENTS

| 6,304,915 | B1 * | 10/2001 | Nguyen et al. ........... 709/250 |
| 6,839,682 | B1 * | 1/2005 | Blume et al. ........... 705/10 |
| 7,069,234 | B1 * | 6/2006 | Cornelius et al. ........... 705/80 |
| 7,263,506 | B2 * | 8/2007 | Lee et al. ........... 705/38 |
| 2002/0099649 | A1 * | 7/2002 | Lee et al. ........... 705/38 |
| 2003/0018563 | A1 * | 1/2003 | Kilgour et al. ........... 705/37 |
| 2003/0140007 | A1 * | 7/2003 | Kramer et al. ........... 705/40 |
| 2004/0024692 | A1 * | 2/2004 | Turbeville et al. ........... 705/38 |
| 2008/0046334 | A1 * | 2/2008 | Lee et al. ........... 705/26 |

* cited by examiner

*Primary Examiner* — Frantzy Poinvil
(74) *Attorney, Agent, or Firm* — Vista IP Law Group LLP

(57) ABSTRACT

Systems and methods for quantifying and managing financial risks related to a processing agent or transaction acquiror's relationship to a merchant are described. Factor analysis may be utilized to determine one or more principal components from data associated with merchant credit transactions, and such principal components may be utilized in the calculation of cumulative distribution functions and the generation of probability values, which may be averaged and compared with predetermined thresholds to provide a quantitative basis for determining whether a risk management event related to one or more particular merchants should be triggered. Net estimated forward-looking liabilities for particular merchants and groups of merchants may be quantitatively assessed and acted upon.

25 Claims, 12 Drawing Sheets

```
                                                              ┌─ 160
┌─────────────────────────────────────────────────────────────┐
│              Select Peer Groups – Example:                  │
│                                                             │
│ 2 factors:                                                  │
│                                                             │
│ 1.  merchant maturity = "young" [longevity less than 1      │
│     year] or "old" [longevity greater than or equal to 1    │
│     year];                                                  │
│                                                             │
│ 2.  bankcard MCC code (used by bankcard entities to         │
│     categorize a merchant's primary business)               │
│                                                             │
└─────────────────────────────────────────────────────────────┘
```

FIG. 6

```
                                                              ┌─ 162
┌─────────────────────────────────────────────────────────────┐
│           Select Critical Variable paradigm – Example:      │
│                                                             │
│ Critical Variable = "merchant death";                       │
│                                                             │
│ Categories of merchant death:                               │
│                                                             │
│ 1.  merchant will die within 1 month;                       │
│ 2.  merchant will die within 2 months;                      │
│ 3.  merchant will die within 3 months;                      │
│ 4.  merchant will die within 4 months;                      │
│ 5.  merchant will die within 5 months;                      │
│ 6.  merchant will die within 6 months;                      │
│                                                             │
│ Assumption: if a merchant is not Category 1, 2, 3, 4, 5,    │
│ or 6, assume that such merchant will not die.               │
└─────────────────────────────────────────────────────────────┘
```

FIG. 7

Postulate and Calculate Factors – Example:

Try to find factors using industry experience that will be correlated with critical variable categorization. For example, assume the peer group is "old" + "Convenience Stores".

Credit industry experts might correlate credit card fraud and increasing chargeback liabilities with likelihood of Merchant Death. In a convenience store, nearly all credit card transactions should be by card swipe (i.e., using the magnetic strip of a credit card), not by keypad card number entry, and a relatively high ratio of keypad transactions relative to card swipe transactions is likely to be indicative of fraud (i.e., card is not present where it normally would be).

Thus the following two factors are postulated to be correlated with merchant death in this peer group:

1. ratio of keypad transactions to swiped transactions per month;
2. ratio of chargebacks to total sales processed per month.

FIG. 8

Perform Factor Analysis and extract Principal Components – Example:

Perform factor analysis on the subset of data related to each peer group. In this example, the peer group is "Old" + "Convenience Stores".

Principal components most correlated to merchant death:

1. ratio of keyed vs swiped transactions (call it "PC1);
2. ratio of chargebacks to total sales (call it "PC2")
3. ratio of transactions under $3 (call it "PC3")

Calculate the Cumulative Distribution Function (CDF) for each Principal Component; Group Probability Value results by Critical Value (i.e., "death") category – Example:

PC1 – Swiped vs Keyed – CDF from Historical Data:

*PC-1 - Keyed vs Swiped - Ratio*

| PC Value | Prob (merch death - at 1month) | Prob (merch death - at 2months) | Prob (merch death - at 3months) |
|---|---|---|---|
| 0-.25 | 2% | 3% | 4% |
| .26-.50 | 4% | 5% | 6% |
| .51-.75 | 7% | 8% | 9% |
| .76-1.00 | 8% | 9% | 10% |
| | Prob (merch death - at 4months) | Prob (merch death - at 5months) | Prob (merch death - at 6months) |
| 0-.25 | 5% | 6% | 7% |
| .26-.50 | 7% | 8% | 9% |
| .51-.75 | 10% | 11% | 12% |
| .76-1.00 | 11% | 12% | 13% |

PC2 – Chargebacks vs Total – CDF from Historical Data:

*PC-2 -Chargebacks vs Total - Ratio*

| PC Value | Prob (merch death - at 1month) | Prob (merch death - at 2months) | Prob (merch death - at 3months) |
|---|---|---|---|
| 0-.25 | 2% | 3% | 4% |
| .26-.50 | 5% | 6% | 7% |
| .51-.75 | 6% | 7% | 8% |
| .76-1.00 | 7% | 8% | 9% |
| | Prob (merch death - at 4months) | Prob (merch death - at 5months) | Prob (merch death - at 6months) |
| 0-.25 | 5% | 6% | 7% |
| .26-.50 | 8% | 9% | 10% |
| .51-.75 | 9% | 10% | 11% |
| .76-1.00 | 10% | 11% | 12% |

PC3 – Transactions under $3 – CDF from Historical Data:

*PC-3 - Ratio of transactions less than $3*

| PC Value | Prob (merch death - at 1month) | Prob (merch death - at 2months) | Prob (merch death - at 3months) |
|---|---|---|---|
| 0-.25 | 2% | 3% | 4% |
| .26-.50 | 3% | 4% | 5% |
| .51-.75 | 4% | 5% | 6% |
| .76-1.00 | 5% | 6% | 7% |
| | Prob (merch death - at 4months) | Prob (merch death - at 5months) | Prob (merch death - at 6months) |
| 0-.25 | 5% | 6% | 7% |
| .26-.50 | 6% | 7% | 8% |
| .51-.75 | 7% | 8% | 9% |
| .76-1.00 | 8% | 9% | 10% |

FIG. 10

Average the Principal Component Values for each Critical Variable
category, for each merchant – Example:

Say Merchant1 ("Springfield Quick-e Mart") has a swiped to keyed transaction ratio of 0.33, a chargeback to total of 0.22, and a transactions under $3 ratio of 0.71.

Averaging the Principal Component Probability Values for these ranges, for each of the critical variable categories, Springfield Quick-e Mart has the following probability value profile:

| *Springfield Quick-e Mart:* |
| --- |
| PC-1 Value: .33 |
| PC-2 Value: .22 |
| PC-3 Value: .71 |
|  |
| *Averaging Probabilities across PC-1, 2, 3:* |
| 3%   death at 1 month |
| 4%   death at 2 months |
| 5%   death at 2 months |
| 6%   death at 2 months |
| 7%   death at 2 months |
| 8%   death at 2 months |
| 65%  remainder, assumed to not die |

FIG. 11

Select or compute a Decision Threshold for each Critical Variable
category of Probability Values – Example:

Utilizing the data for relatively well-established convenience stores, computational analysis may be conducted with a Loss Function to determine threshold values for each critical variable category, above which an event shall be triggered, such as a decision by a processor to terminate or counsel a merchant. Alternatively, or in combination with such computational analysis, business judgment may be utilized to select such threshold values.

In this example of well-established convenience stores, the selection of threshold values is as follows:

Trigger an event (decision, warning, etc) when:

A. the probability of merchant death at 1 month is greater than 4.0%;
B. the probability of merchant death at 2 months is greater than 5.0%;
C. the probability of merchant death at 3 months is greater than 4.5%;
D. the probability of merchant death at 4 months is greater than 5.5%;
E. the probability of merchant death at 5 months is greater than 6.5%; or
F. the probability of merchant death at 6 months is greater than 7.5%;

FIG. 12

Compare merchant Probability Values with Decision Threshold values –
Example:

Utilizing the averaged probability value profile for Springfield Quick-e Mart:

| Springfield Quick-e Mart | | |
|---|---|---|
| PC-1 Value: .33 | | |
| PC-2 Value: .22 | | |
| PC-3 Value: .71 | | |
| | | |
| Averaging Probabilities across PC-1, 2, 3: | Threshold | Trigger Event? |
| 3% death at 1 month | 4.0% | no |
| 4% death at 2 months | 5.0% | no |
| 5% death at 3 months | 4.5% | YES |
| 6% death at 4 months | 5.5% | YES |
| 7% death at 5 months | 6.5% | YES |
| 8% death at 6 months | 7.5% | YES |
| 65% remainder, assumed to not die | | |

Worst Case Scenario Interpretation:

Expect Springfield Quick-e mart to die 3 months from now.

FIG. 13

SYSTEM AND METHOD FOR MERCHANT RISK MANAGEMENT

FIELD OF THE INVENTION

The invention relates to the interaction of remotely located transaction processing terminals and centralized transaction processing systems, and specifically to systems and methods which may be employed by transaction processors to mitigate economic risks related to merchants.

BACKGROUND

Merchant terminals, utilized to process consumer transactions such as credit card transactions, are ubiquitous worldwide. Referring to FIG. 1, in the case of credit card transactions, processors functioning as agents for acquiring banks, or independent sales organizations, often lie (30) in the stream of commerce interposed between merchant terminals (20), issuing banks (50), and credit card companies (40, 42, 44). The interaction (60) between merchants and processors is not without risk for the processors, due in part to contractual and regulatory complexities that relate to the processing of credit card transactions. Referring to FIG. 2, some aspects of such risks for processors are illustrated. When a merchant engages (70) in a credit card transaction with a customer, there is a chance that issues such as fraud, mistake, bad business practices, and/or failure of the goods/services may result in what is known as a "chargeback" by an issuing bank, whereby a credit transaction acquirer may be debited for the amount of the chargeback by a credit card company. In such a situation, the acquirer, independent sales organization, and more typically, a processing agent or "processor" who has contractually taken on such obligations, then has the task of recovering the funds from the merchant, or from "merchant specific reserves" maintained by the acquirer or processor for such purposes. Thus such a processor would be taking on a chargeback liability (72). If the merchant remains in business (74), it can be pursued to compensate the processor and/or acquirer for this chargeback liability, generally through use of a contractually predetermined process (76). If the merchant does not remain in business, a condition which may be termed "merchant death", the processor and/or acquirer may pursue (78) utilizing any merchant specific reserves to cover the chargeback liability. In the event that such reserves are indeed adequate and contractually available to cover the chargeback liability, the processor and/or acquirer generally will utilize them (84). In the event that the merchant specific reserves are not adequate to cover the chargeback liability, such liability flows to or remains with (80) the processor, independent sales organization (ISO), or acquiring bank, and most conventionally, by contract to the processor. As is illustrated in FIG. 2, given such a paradigm of risk management between merchants, acquiring banks, ISOs, processors, issuing banks, and credit card associations, there is a need for processors to have improved ability to both manage the reserve terms pertinent to merchants for most equitably matching the risks placed upon processors (86), and also to mitigate downstream risks of having to fund uncovered chargeback liabilities from the operating profits of the processor (82).

SUMMARY

One embodiment is directed to a method for quantifying merchant credit risk, wherein a factor analysis may be performed on a historical dataset to extract one or more principal components related to a critical variable associated with merchant credit risk. A cumulative distribution function may be calculated for each of the one or more principal components comprising one or more probability values, and the principal component probability values for a merchant may be averaged. These averaged values may be compared with a predetermined decision threshold value to determine whether a risk management event related to the merchant should be triggered. The method may further comprise selecting two or more categories for the critical variable. In one embodiment, the critical variable may be termination of a merchant's business operation, with the merchant assumed to continue in business if not placed in one of the business termination critical variable categories. Calculating the cumulative distribution function may comprise computing separately a cumulative distribution function for each principal component of each of the two or more critical variable categories. The method may also involve performing factor analysis and calculating a cumulative distribution function on a first periodic basis, while averaging principal component probability values and comparing the averaged principal component probabilities values with a predetermined threshold value may be performed on a second periodic basis substantially greater in frequency than the first periodic basis. In one embodiment, for example, the first periodic basis may be about every six months, and the second periodic basis may be about every day, or every business day. The method may also comprise selecting one or more peer groups of merchants, placing the merchants in such peer groups, and performing factor analysis, calculating a cumulative distribution function, and comparing with the data pertinent to a particular peer group, as isolated from the data of other peer groups.

The method may also comprise determining a decision threshold value by performing loss function analysis on the historical data to minimize losses from false positive and false negative critical variable categorization, and performing loss function analysis may comprise executing automated computational analysis of the historical data. Further, the computational analysis may incorporate predetermined quantized loss factors, the values of which are based upon business judgment analysis.

The method may further comprise determining net estimated liabilities for the merchant by quantifying a downside liability based upon a triggered risk management event, less a merchant specific reserves amount held for such merchant. The downside liability may be quantified based upon the earliest-in-time event triggering scenario, or based upon the largest liability associated with any event triggering scenario. The method may further comprise determining net estimated liabilities for each merchant in a portfolio of peers and summing these values to derive a forward looking portfolio liability for the peers. Further, the method may comprise automatically executing risk remediation with the merchant based upon the net estimated liabilities by dispatching to the merchant information regarding merchant specific reserves or one or more factors correlated with principal component values. Dispatching may comprise sending an electronic message to the merchant utilizing a system such as an email server, a credit processing terminal, a cellphone, a PDA, or a text message server.

Another embodiment is directed to a system for quantifying merchant risk having a central processor and a database containing credit-transaction-related data. The central processor may be configured to populate the database with updated data on a daily basis based upon electronic interaction with remotely-located merchant credit terminals, to assemble data from the database in the form of a current quantitative data and historical quantitative data, to perform factor analysis on the historical quantitative dataset to extract one or more principal components related to a critical variable associated with merchant credit risk, to calculate a cumulative distribution function for each of the one or more principal components comprising one or more probability values, average the principal component values, and compute a decision threshold using the historical data based on a loss function, to compute and then average the principal component probability values for a merchant utilizing the current quantitative dataset, and to compare the averaged principal component probability values for the merchant with the predetermined decision threshold value to determine whether a risk management event related to the merchant should be triggered.

The processor may be further configured to utilize a preselected multiplicity of categories for the critical variable in the cumulative distribution function calculation, principal component probability value averaging, and comparison with decision threshold values. The processor may be further configured to assemble the current quantitative datasets into short and long window subsets for each merchant, and historical quantitative datasets into subsets associated with one or more preselected peer groups of merchants, and to perform factor analysis, calculate a cumulative distribution function, average the principal component probability values utilizing data from the current quantitative datasets, and independently for each peer group, compare with decision threshold values, utilizing data from the historical and current data subset pertinent to such peer group.

In addition the processor may be configured to determine a decision threshold value by performing loss function analysis on the historical data to minimize losses from false positive and false negative critical variable categorization. The processor may be further configured to determine net estimated liabilities for the merchant by quantifying a downside liability based upon a triggered risk management event, less a merchant specific reserves amount held for such merchant.

The processor may be further configured to automatically execute risk remediation with the merchant based upon the net estimated liabilities by dispatching to the merchant information regarding merchant specific reserves or one or more factors correlated with principal component values. This dispatching may comprise sending an electronic message to the merchant utilizing a system such as an email server, a credit processing terminal, a cellphone, a PDA, or a text message server.

In addition, the system may be configured such that the value for total net liabilities is computed for each critical variable category, each month, to compute a measure of risk-department effectiveness using dashboard trend lines.

BRIEF DESCRIPTION OF THE DRAWINGS

FIG. 6 illustrates a diagrammatic view of certain aspects of a configuration for managing processor risk utilizing quantitative data and analysis, wherein peer groups are selected.

FIG. 7 illustrates a diagrammatic view of certain aspects of a configuration for managing processor risk utilizing quantitative data and analysis, wherein a critical variable paradigm is selected.

FIG. 8 illustrates a diagrammatic view of certain aspects of a configuration for managing processor risk utilizing quantitative data and analysis, wherein factors are postulated and calculated.

FIG. 9 illustrates a diagrammatic view of certain aspects of a configuration for managing processor risk utilizing quantitative data and analysis, wherein factor analysis is performed.

FIG. 10 illustrates a diagrammatic view of certain aspects of a configuration for managing processor risk utilizing quantitative data and analysis, wherein a cumulative distribution function is determined.

FIG. 11 illustrates a diagrammatic view of certain aspects of a configuration for managing processor risk utilizing quantitative data and analysis, wherein principal component probability values are averaged.

FIG. 12 illustrates a diagrammatic view of certain aspects of a configuration for managing processor risk utilizing quantitative data and analysis, wherein a decision threshold is selected or computed.

FIG. 13 illustrates a diagrammatic view of certain aspects of a configuration for managing processor risk utilizing quantitative data and analysis, wherein merchant probability values are compared to threshold values.

DETAILED DESCRIPTION

Figure 1:
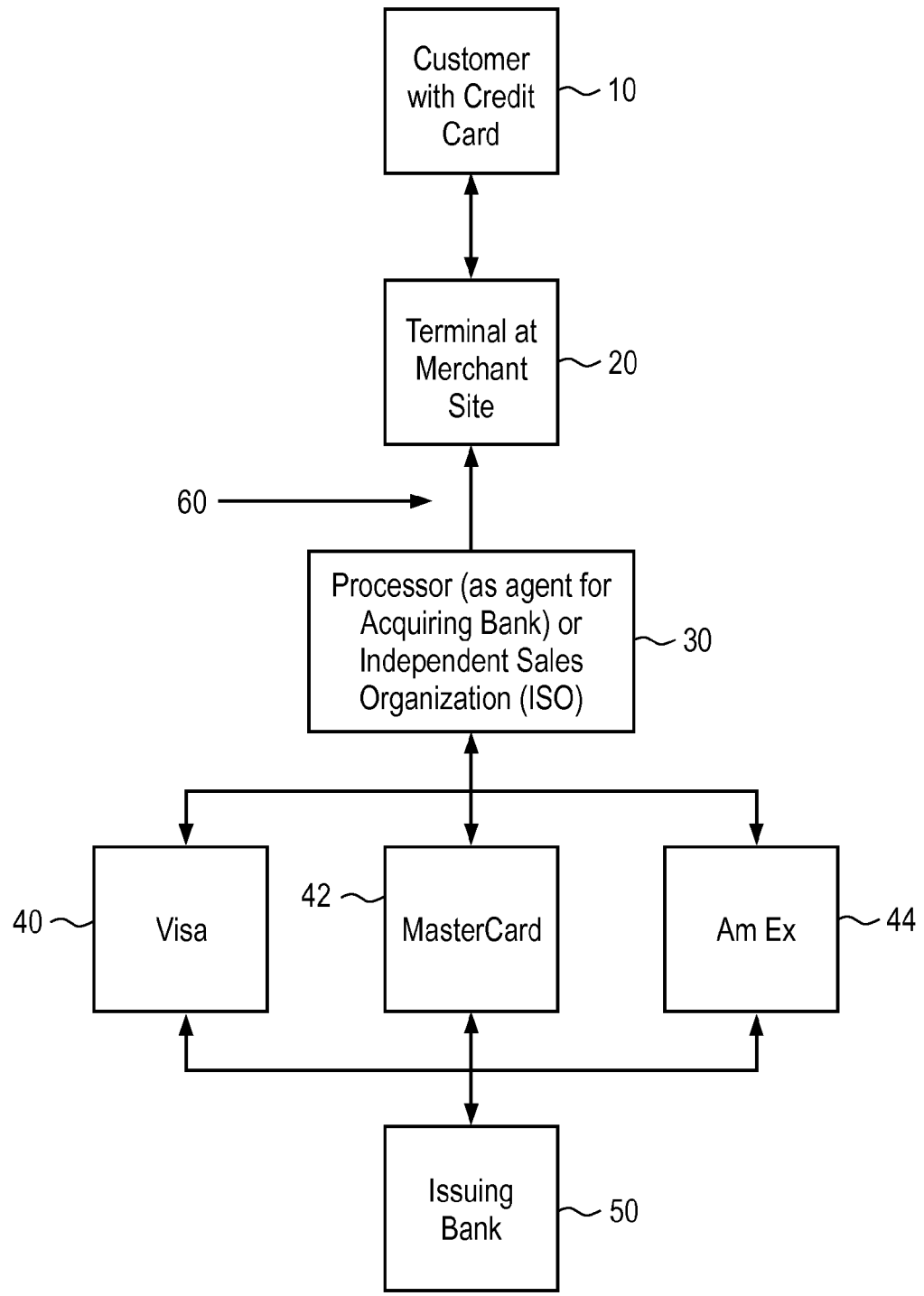
FIG. 1 illustrates a diagrammatic view of a conventional transaction processing relationship chain.
Figure 2:
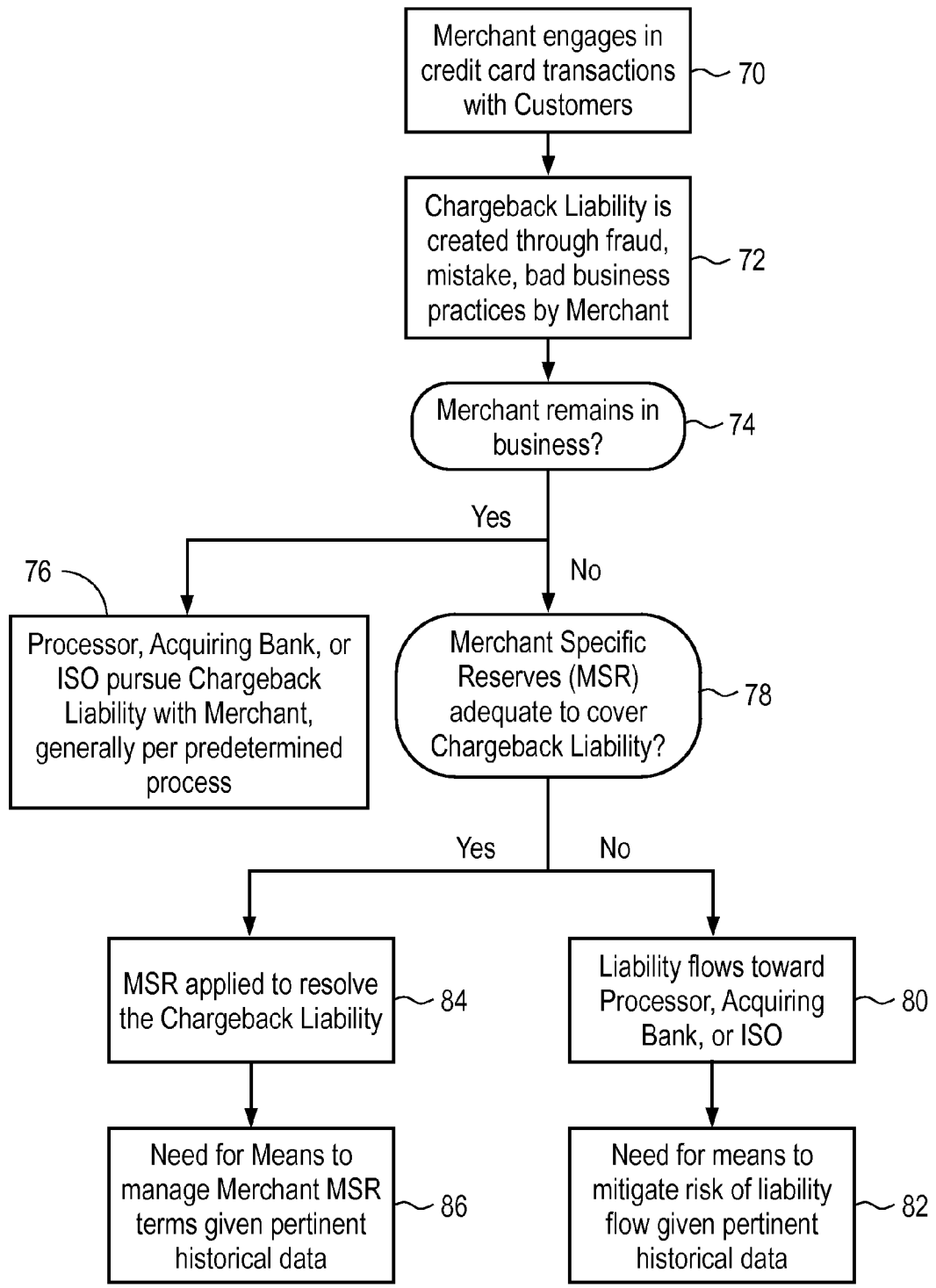
FIG. 2 illustrates a diagrammatic view of certain aspects of a conventional transaction processing relationship chain resulting in potential risk for a transaction processor.
Figure 3:
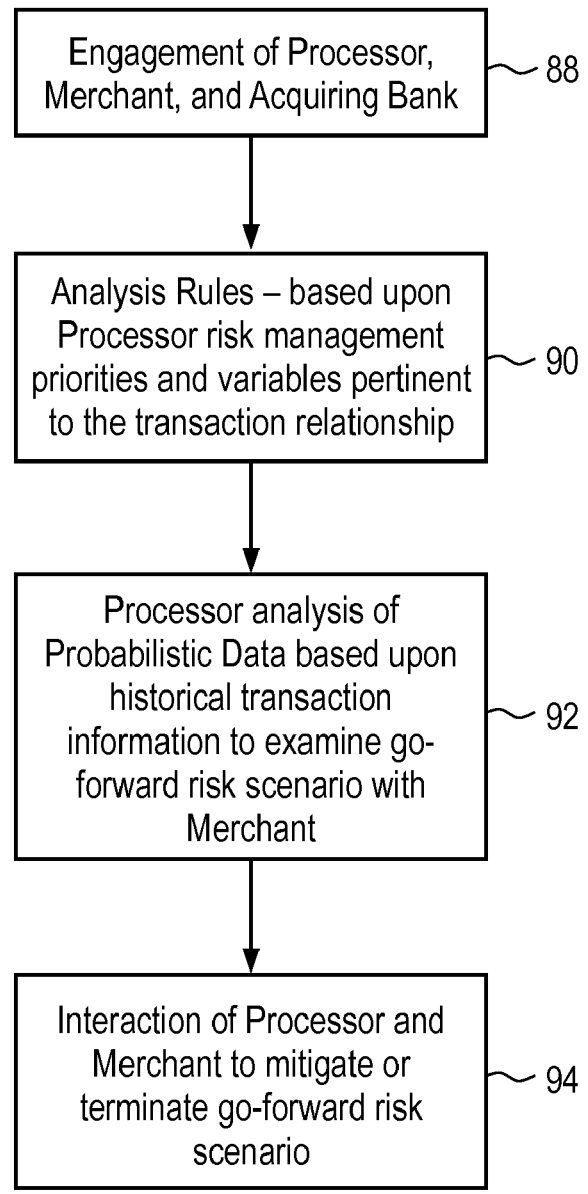
FIG. 3 illustrates a diagrammatic view of a configuration for managing processor risk.

Referring to FIG. 3, to address challenges presented by the interrelationship of customers, merchants, issuing banks, card associations, processors, and acquirers, an embodiment of an inventive system configuration is illustrated in overview form. As shown in FIG. 3, initially a merchant, processor, and acquiring bank are engaged (88) in a transaction flow whereby transactions are consummated and processed to facilitate the sale of goods and services under a set of contractually determined terms between the parties to dictate procedures, policies, liability, and other issues. A processor may configure its systems with analysis rules (90) to manage its own risk based upon variables most closely related to risk exposure in its relationships with merchants and acquiring banks. Such rules preferably are derived computationally utilizing historical data pertinent to a given set of merchants. With risk mitigating rules in place, the processor's system preferably is configured to analyze (92) current data using such rules to assist the processor in assessing the downstream risk scenario for a given merchant or set of merchants, subsequent to which the processor may interact (94) with one or more merchants to mitigate the risk by modifying certain aspects of the relationship (e.g., by holding funds, increasing reserves), and potentially requiring a termination of one or more merchant relationships. Thus, from an overview perspective, with a transactional relationship engaged (88), a processor may create risk management rules (90) through analysis of historical data, and apply (92) these rules to current data to assist in risk mitigation interactions (94) with merchants. All of this may be conducted with the subject technologies in an automated fashion, in contrast to conventional risk mitigation techniques utilized by processors and independent sales organizations, for example, wherein rules may be human-derived based on human analysis and judgment of historical data. The subject invention may be utilized to engage quantitative and/or statistical techniques to automatically create the relevant rules (including thresholds) that are most likely to apply to a particular merchant or peer group, with the automatically-chosen rules for a merchant varying depending upon the time period being analyzed. Further details and aspects of such a configuration, and alternative configurations, are illustrated in the embodiments described in reference to FIGS. 4-15.

Figure 4:
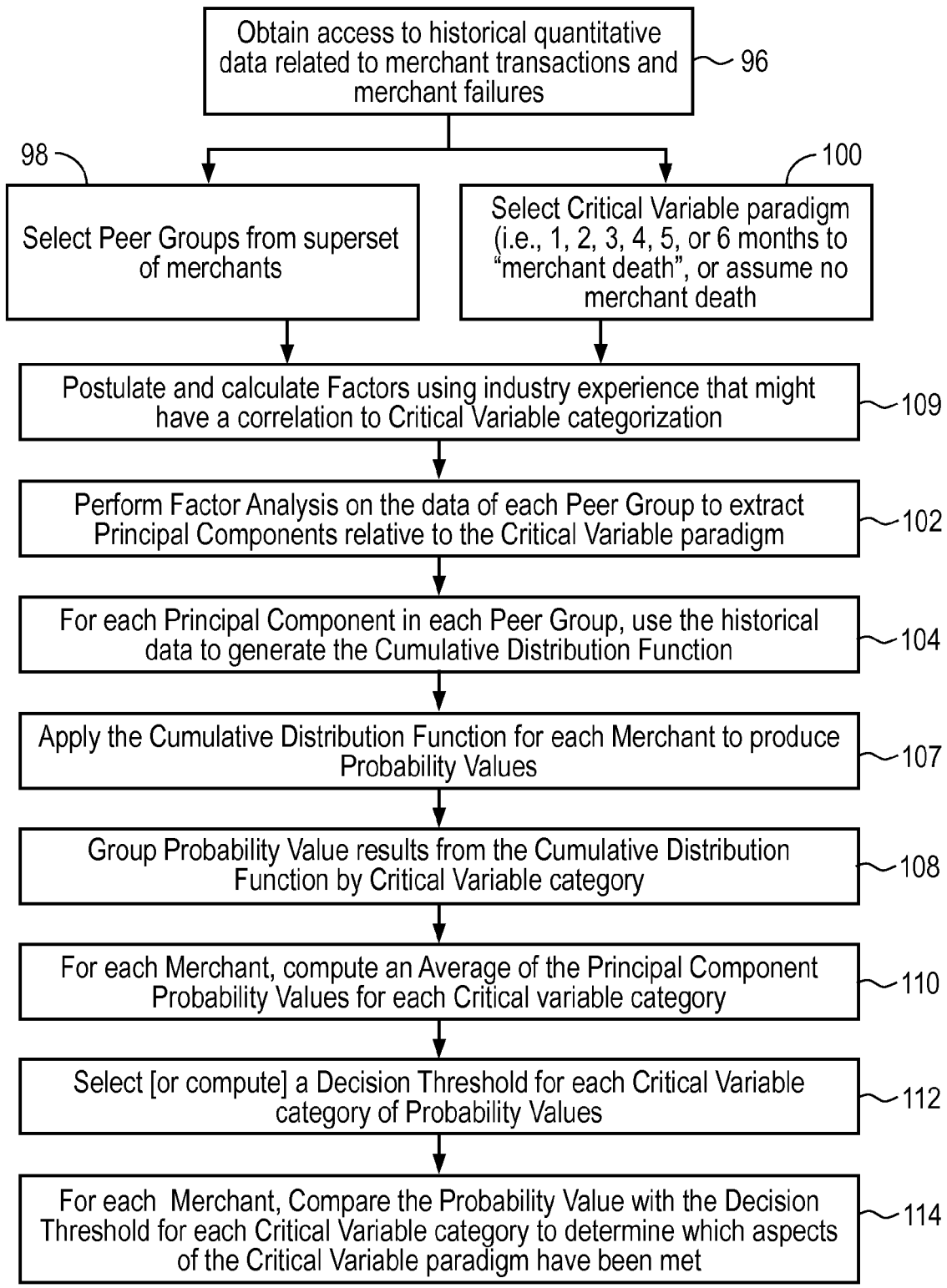
FIG. 4 illustrates a diagrammatic view of a configuration for managing processor risk utilizing quantitative data and analysis.

Referring to FIG. 4, an embodiment is illustrated whereby rules are created from historical transaction data and may be applied to more current transaction data for risk management utility by a transaction processor. As shown in FIG. 4, access (96) to historical quantitative data related to merchant transactions is a prerequisite for the quantitative analysis described herein. In one embodiment, a processor will have electronic access to a local or remote database containing transaction-related information, such as transaction amounts, processing information, parties involved in the transaction flow, and location of the terminal for each sale, as related to each merchant, in addition to information related to the particular merchants, such as U.S. government SIC codes, bankcard entity MCC codes, store-front or web/mail/phone order based status, location addresses, period of time in business, number of employees, and/or starting capital at initiation of business. Preferably the superset of quantitative data comprising transaction data and merchant data contains information related to, or correlated to, a merchant failure of interest to be analyzed with the inventive system, such as information related to underfunded chargeback liabilities which flow back to a processor, depending upon the selected critical variable paradigm, as described below. Such merchant data may be placed into a database as a contractual requirement of initiating a transactional relationship, for example, with a transaction processor and/or acquiring bank. Preferably a processor will have access to current quantitative data for relatively long retrospective "window" of time, such as one to four quarters, and historical data quantitative data for one to five years. In one embodiment, a long window dataset is kept updated by constantly moving the window forth as current time goes by. For example, in an embodiment wherein a long window dataset is representative of the last three months of data from a current date of January 1, such long window dataset will include data from approximately October 1 through December 31; on January 16, such long window dataset will include data from approximately October 15 through January 15.

Referring again to FIG. 4, given access to pertinent historical quantitative data (96), peer groups of merchants (98) and critical variables (100) may be selected. Peer groups preferably are selected to place each merchant from the superset of data into precisely one peer group, with each peer group having a merchant population with an acceptable population of merchants representing a panoply of risk management scenarios relative to the processor. One or more factors may be utilized to create peer groups. For example, referring to FIG. 6, an illustrative example (160) is depicted wherein by utilizing a set of two factors, merchant maturity and bankcard MCC code, a processor is able to create more than one peer group. Indeed, with such example (160), depending upon the data contained in the long window dataset, if there are two maturity categories, young and old, as depicted, and if there are 100 different MCC codes used by bankcard entities to categorize the primary business of a merchant, then there could be 200 different peer groups. The number of factors, and number of categories within each factor (in the aforementioned scenario—2 factors total; 2 categories for the first factor of "maturity"; 100 categories for the second factor of "MCC Code") may be tailored by the processor to provide peer group long window datasets that contain sufficient information for quantitative analysis.

Referring again to FIG. 4, a critical variable paradigm also is selected to identify the focus of the quantitative analysis that follows. In other words, a critical variable paradigm is selected to provide a processor with valuable risk management results subsequent to analysis regarding such critical variables. For example, referring to FIG. 7, the critical variable of "merchant death" has been selected, as information regarding such a variable is highly relevant to a processor's ability to manage risk in a processor-merchant transaction processing relationship wherein certain merchants may cease, or "die", as business entities, leaving processors with liabilities, as described above. The depicted critical variable paradigm (162) has six categories for the critical variable of "merchant death"—merchant will die in 1 month, merchant will die in 2 months, merchant will die in 3 months, merchant will die in 4 months, merchant will die in 5 months, and merchant will die in 6 months. In the event that a merchant is not placed in one of these categories, it will be categorized as a merchant that, for the purposes of the analysis, will not die. Other critical variable categories are also possible, such as whether or not the merchant's transactional history is consistent with the underwriting criteria the acquirer/ISO/processor applied at the time of merchant acceptance, or as of the merchant's most recent underwriting review by the acquirer/ISO/processor.

Referring back to FIG. 4, having selected peer group (98) and critical variable (100) paradigms, factor analysis may be conducted on the long window data of individual peer groups to extract principal components relative to the selected critical variable paradigm. Factor analysis is a conventional statistical analysis technique utilized to quantitatively understand which variables (the "principal components") have the greatest impact on a dependent variable of interest; it is employed herein to quantitatively develop a preferably short list of principal components that are highly correlated with the critical variable for the particular peer group of interest. The conventional use of factor analysis and principal components are described, for example, in "Principal Component Analysis and Factor Models" by Ruey Tsay (John Wiley & Sons publishers, 2005). In one embodiment, factor analysis (102) may be performed subsequent to postulating and calculating factors using industry experience (109) that may have correlation to critical variable categorization. Referring to FIGS. 8 and 9, the example from FIGS. 6 and 7 is continued. Given a peer group of "old convenience stores", it is postulated that two factors are likely to be correlated with merchant death: ratio of keyed to swiped credit card transactions, and ratio of chargebacks to total sales processed for a given month (164). As shown in FIG. 9, factor analysis is then utilized (166) to determine that for the peer group of "old convenience stores", three principal components actually are most correlated with the critical variable of merchant death: ratio of keyed versus swiped transactions, ratio of chargebacks to total sales, and ratio of transactions under $3. For illustrative purposes, these principal components are labeled as "PC1", "PC2", and "PC3", respectively.

Referring back to FIG. 4, having postulated correlated factors (109) and performed factor analysis to extract the principal components (102), the building of an analysis construct is continued by utilizing the long window historical data to calculate the cumulative distribution function for each principal component of each peer group (104). Aspects of a cumulative distribution function are described, for example, in "A Photographic View of Cumulative Distribution Functions" by Robert W. Jernigan (Journal of Statistics Education Volume 16, Number 1, 2008). Referring to FIG. 10, the example described in reference to FIGS. 6-9 above is continued. As shown in FIG. 10, a cumulative distribution function (or "CDF") for each of the principal components, PC1, PC2, and PC3, is created and displayed for each critical variable category. Referring back to FIG. 4, given the critical variable categories and the principal components, the CDF assembles from the long window historical data probability values for each category of the peer group. Referring again to FIG. 10, CDF analysis and presentation of probability values for each principal component by range sector and critical variable category are depicted (168). One can see from the example data that for the swiped versus keyed principal component (PC1), for the selected peer group ("old"+"convenience store"), based upon the long window historical data, if a merchant has a keyed versus swiped ratio of 0-0.25, it has a 2% likelihood of death at 1 month in the future, 3% likelihood of death at 2 months in the future, 4% likelihood of death at 3 months in the future, 5% likelihood of death at 4 months in the future, 6% likelihood of death at 5 months in the future, and 7% likelihood of death at 6 months in the future. Additional exemplary data is presented in FIG. 10 for other range sectors and other principal components (168).

Referring back to FIG. 4, subsequent to computation of the CDF to provide probabilities for each peer group, for each critical variable category, the principal component probability values pertinent to a particular merchant, utilizing current, or "short window", data may be averaged (110). Such averaging for an exemplary merchant ("Springfield Quick-e Mart") in the continued example from FIGS. 6-10, is depicted in FIG. 11 (170).

Referring to FIG. 11, given the short window position of Springfield Quick-e Mart in the second lowest PC1 range, the lowest PC2 range, and the second highest PC3 range, the data from FIG. 10 is utilized to compute the average (170) probabilities for the Springfield Quick-e Mart scenario. Accordingly, the quantative analysis predicts that Springfield Quick-e Mart has a 3% chance of dying in 1 month, 4% chance of dying in 2 months, 5% chance of dying in 3 months, 6% chance of dying in 4 months, 7% chance of dying in 5 months, a 8% chance of dying in 6 months, and a 65% chance of living. In other scenarios, the relevance of short window versus long window data is more apparent, depending upon the particular principal components pertinent to the critical variables at hand. For example, in another example (not shown), a principal component of "ticket amount" will have a transient nature in the short window as it varies with the operation on a day to day basis. In one embodiment it is useful to average ticket amount over a short window versus ticket amount over a long window, or as compared with merchant assertions at the time of underwriting.

Referring again to FIG. 4, a decision threshold may be selected or computed (112) for the probability values in each critical variable category. This preferably involves the use of a loss function to minimize the impact of false positives and false negatives upon the processor. Referring to FIG. 12, the example of old convenience stores is continued from FIGS. 6-11. As shown in FIG. 12, the thresholds (172) are depicted for each critical variable category: if a merchant is more than 4% likely to die at 1 month, trigger an event; if a merchant is more than 5% likely to die at 2 months, trigger an event; if a merchant is more than 4.5% likely to die at 3 months, trigger an event; if a merchant is more than 5.5% likely to die at 4 months, trigger an event; if a merchant is more than 6.5% likely to die at 5 months, trigger an event; and if a merchant is more than 7.5% likely to die at 6 months, trigger an event; otherwise, do not trigger an event. The "event" may be selected by the processor entity and preferably comprises a decision to execute a risk mitigation plan with the particular merchant, hold funds temporarily, warn them, terminate them, require increased merchant specific reserves, counsel them regarding how to modify their businesses to affect the principal components in the analysis paradigm, etcetera. In the depicted example, loss function analysis preferably would be utilized to evaluate the economic value of losses from a) terminating, either intentionally or unintentionally as a result of a merchant reaction to some variation of event triggering, a merchant who actually would have survived but was statistically past the threshold probability value, and thereby losing the revenue stream and presumed profits from that merchant relationship; b) failing to terminate a merchant who, notwithstanding surviving the threshold probability value analysis, died earlier than predicted by the analysis paradigm and ended up costing the processor it the form of unfunded or underfunded liability. Such loss function analysis may be computed entirely quantitatively and automatically using iterative analysis of historical data, such as the long window data, to examine scenarios and losses. Alternatively, a processor may elect to add elements of business judgment into the analysis—for example, by creating a quantitative representation for the value of merchant annoyance and associated more likely voluntary termination before a desired termination by a processor, which may be resultant from too many events being triggered for a particular merchant. Further, the expertise of a processor may lead it to manually select threshold values based upon experience with such values or other factors—still in a loss-function analysis approach, whereby the processor is rationally attempting to maximize gains and minimize losses.

Referring back to FIG. 4, with decision thresholds in place (112) and the data computed for a particular peer group and particular merchant, such as the example of Springfield Quick-e Mart, computed probability values may be compared (114) with decision threshold to trigger events. As shown in FIG. 13, the example from FIGS. 6-12 is continued for the data pertinent to Springfield Quick-e Mart, with comparison (174) showing that Springfield Quick-e Mart has crossed the selected thresholds for death at 3, 4, 5, and 6 months. Preferably the system is configured to elect a worst case scenario utilizing one of two modes: a) put the triggering party (merchant, in this case) in the category wherein they are expected to cross the threshold (die, in this case) the earliest in time; or b) put the triggering party in the category wherein they are expected to cause the most economic damage. In one embodiment, both modes are computed and output for an operator to examine. In the example depicted in FIG. 13 (174), the former mode is utilized, and Springfield Quick-e Mart is deemed to die at 3 months.

Figure 5:
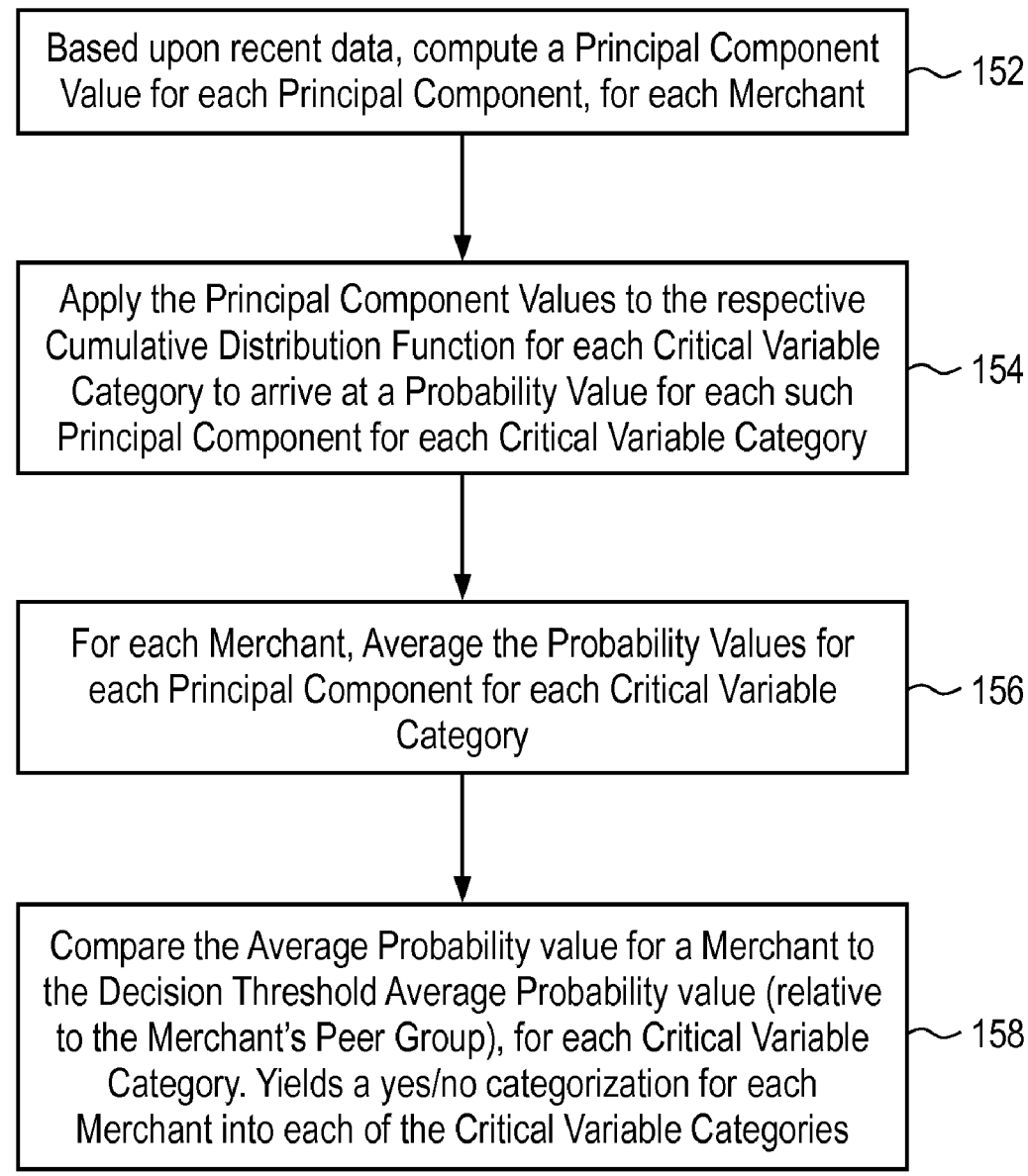
FIG. 5 illustrates a diagrammatic view of a configuration for managing processor risk utilizing quantitative data and analysis.

Thus the process described above in reference to FIGS. 4 and 6-13 is capable of yielding a yes/no categorization for each merchant into each of the critical variable categories. Indeed, given the rules framework provided by such process, recent data may be utilized on a selected periodic basis to categorize and evaluate merchants. Referring to FIG. 5, based upon recent data, principal component values may be computed for each merchant (152). The principal component values may be utilized to determine probability values for each principal component in each critical variable category (154). Then, for each merchant, the probability values for each principal component, for each critical variable category, may be averaged (156). Finally, the average probability value for a merchant may be compared to decision threshold average probability values for the merchant's peer group, for each critical variable category, to yield a yes/no categorization for each merchant into each of the critical variable categories (158). In one embodiment in practice, it is desirable to perform factor analysis and calculate cumulative distribution functions on a periodic basis substantially more infrequent to conduction of analysis to average principal component probability values and compare them with predetermined thresholds to determine the current risk management scenario. For example, factor analysis and CDF calculation may be done for a particular peer group and critical variable paradigm every six months or so, while principal component probability value averaging and threshold analysis to determine a current risk scenario may be conducted on a daily basis.

Given a computation-based expectation regarding when a given critical variable category such as "merchant death" will be met, as described, for example in reference to FIG. 13, economic analysis may be conducted utilizing the short and long window data available. For example, one embodiment of utilizing aspects of the rules paradigms described in reference to FIGS. 4-13 is described in reference to FIG. 14.

Figure 14:
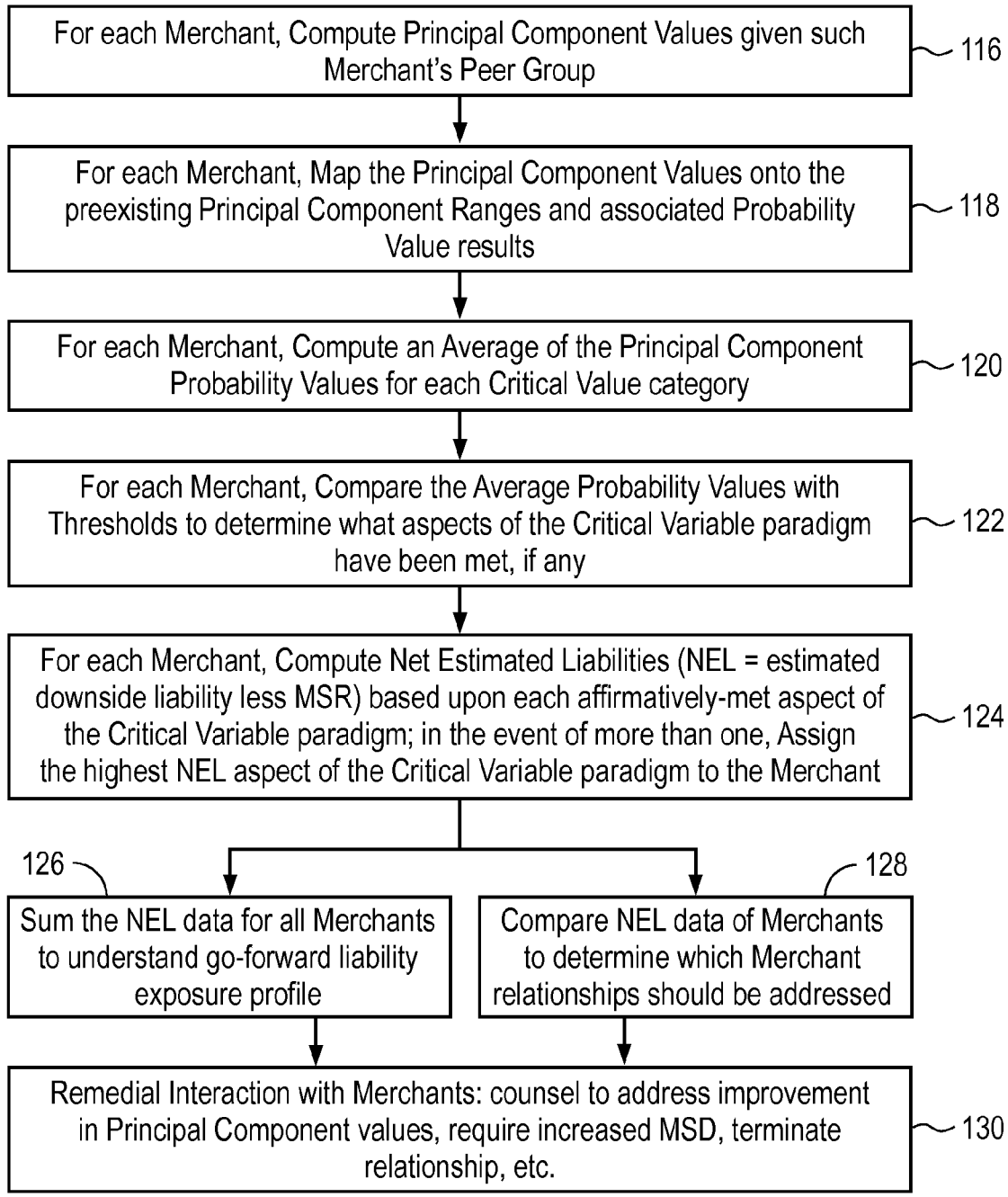
FIG. 14 illustrates a diagrammatic view of certain aspects of a configuration for managing processor risk utilizing quantitative data and analysis, wherein remedial interaction with merchants may be conducted based upon the results of quantitative analysis.

For example, given a long window superset of data for multiple merchants, a peer group paradigm, and a critical variable paradigm, as described in reference to FIGS. 4-13, principal component values may be computed (116) for each peer group, as depicted in FIG. 14. Subsequently, utilizing the short window data of interest, such as fresh daily or monthly transaction data, each merchant may be "mapped" into probability value data from the pertinent cumulative distribution function (118), averages of the mapped principal component values may be computed (120) for each merchant, and comparisons with predetermined thresholds may be conducted (122) to determine whether there are event triggers. In the embodiment depicted in FIG. 14, a value for "net estimated liabilities", or "NEL", is computed (124) based upon the comparison/event triggering analysis, equaling any downside predicted liabilities less merchant specific reserves held by a processor for the particular merchant. In the depicted embodiment, a worst case scenario mode is utilized wherein the highest NEL is assigned to a merchant with multiple event triggers based upon comparison (122). Referring again to FIG. 14, given the NEL data for all merchants, the NEL numbers may be summed (126) to establish an overall measure of the processor's risk-management department, and these measures can be create monthly to create dashboard-trend-lines for management review; alternatively or additionally, the NEL data may be used to compare merchants for further analysis of the merchant population. For example, it may be decided that only the top 5% of NEL merchants will be contacted for remediation. As shown in FIG. 14, remedial interaction (130) may follow such NEL-related analysis, with the processor taking quantitative data into such discussions to address the current probability value paradigm for a given merchant, principal components for their peer group, possible ways to improve principal component and/or probability positions, proposed rationale for increased merchant specific reserve terms, potential relationship termination, and the like. In one embodiment, a value for total net liabilities may be computed for each critical variable category, each month, to compute a measure of risk-department effectiveness using dashboard-trend-lines.

Figure 15:
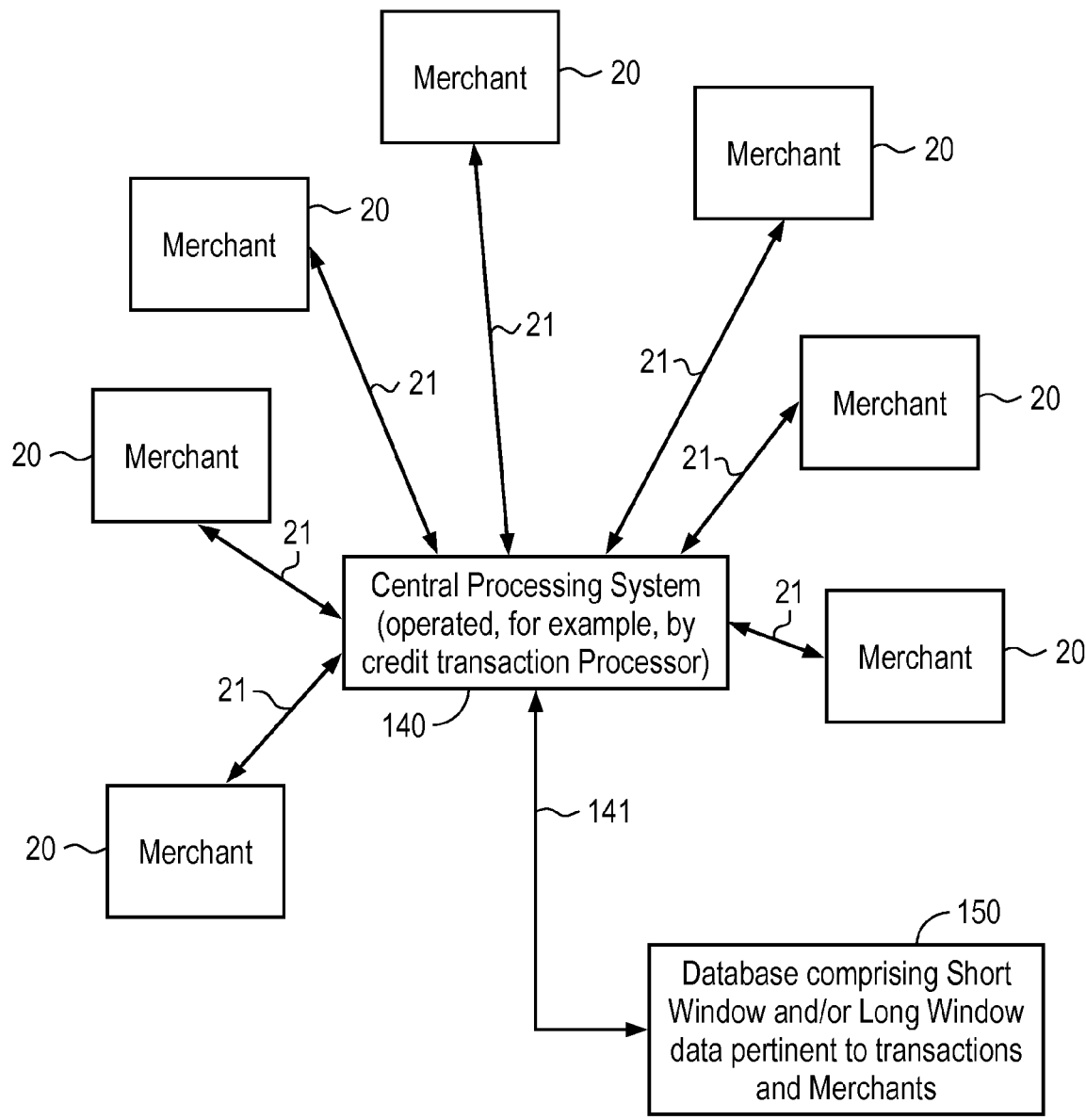
FIG. 15 illustrates a diagrammatic view of an implementation of an embodiment of a configuration for managing processor risk utilizing quantitative data and analysis, wherein electronic communications are utilized.

Referring to FIG. 15, in implementation, configurations such as those described herein may reside on a central processing system (140), such as a computer, preferably with secure electronic access (141) to a database or storage device (150), located either locally or remotely, containing updated long and short window data pertinent to the relevant merchants and transactions. Merchants (20) preferably are connected electronically (21) to the central processing system (140), and preferably the processor may send messages to such merchants (21) from a central processing system (140) utilizing merchant terminals located at the merchant sites, or other modern electronic communication systems such as mail servers, cellphones, personal data assistants ("PDA"s) text messaging, or the like, pertinent to the status of the merchants (20) relative to the quantitative analysis, new short window data, and event triggering. For example, in one embodiment, the central processing system (140) of the processor may be configured to automatically send electronic (21) messages to merchants (20) regarding an event trigger and associated merchant specific reserves and/or one or more factors correlated to principal component values.

While multiple embodiments and variations of the many aspects of the invention have been disclosed and described herein, such disclosure is provided for purposes of illustration only. For example, wherein methods and steps described above indicate certain events occurring in certain order, those of ordinary skill in the art having the benefit of this disclosure would recognize that the ordering of certain steps may be modified and that such modifications are in accordance with the variations of this invention. Additionally, certain of the steps may be performed concurrently in a parallel process when possible, as well as performed sequentially. Accordingly, embodiments are intended to exemplify alternatives, modifications, and equivalents that may fall within the scope of the claims.

The invention claimed is:

1. A computerized method for quantifying merchant credit risk, the computerized method comprising:
   a computer performing factor analysis on a historical dataset to extract one or more principal components related to a critical variable associated with merchant credit risk;
   the computer calculating a cumulative distribution function for each of the one or more principal components comprising one or more probability values;
   the computer averaging the principal component probability values for a merchant; and
   the computer comparing the averaged principal component probability values for the merchant with a predetermined decision threshold value to determine whether a risk management event related to the merchant should be triggered.

2. The method of claim 1, further comprising the computer selecting two or more categories for the critical variable.

3. The method of claim 2, wherein the critical variable is termination of a merchant's business operation, and wherein a merchant is assumed to continue in business if it is not placed in one of the two or more business termination critical variable categories.

4. The method of claim 2, wherein the computer calculating a cumulative distribution function comprises the computer computing separately a cumulative distribution function for each principal component of each of the two or more critical variable categories.

5. The method of claim 1, wherein
the computer performing factor analysis and calculating a cumulative distribution function are performed on a first periodic basis, and
the computer averaging the principal component probability values and comparing the averaged principal component probability values with a predetermined threshold value are performed on a second periodic basis substantially greater in frequency than the first periodic basis.

6. The method of claim 1, wherein the first periodic basis is about every 6 months, and wherein the second periodic basis is about every day.

7. The method of claim 1, further comprising the computer selecting one or more peer groups for categorizing one or more merchants.

8. The method of claim 7, further comprising
the computer placing the merchants in these peer groups, wherein performing factor analysis, calculating a cumulative distribution function, and
the computer comparing are conducted on the data pertinent to a particular peer group, as isolated from the data of other peer groups.

9. The method of claim 1, further comprising the computer determining a decision threshold value by performing loss function analysis on the historical dataset to minimize losses from false positive and false negative critical variable categorization.

10. The method of claim 9, wherein the computer performing loss function analysis comprises the computer executing automated computational analysis of the historical dataset.

11. The method of claim 10, wherein the computational analysis incorporates predetermined quantized loss factors, the values of which are based upon business judgment analysis.

12. The method of claim 1, further comprising the computer determining net estimated liabilities for the merchant by quantifying a downside liability based upon a triggered risk management event, less a merchant specific reserves amount held for said merchant.

13. The method of claim 12, wherein downside liability is quantified based upon the earliest-in-time event triggering scenario.

14. The method of claim 12, wherein downside liability is quantified based upon the largest liability associated with any event triggering scenario.

15. The method of claim 12, further comprising the computer determining net estimated liabilities values for each merchant in a portfolio of peers and summing said values to derive a forward looking portfolio liability for the peers.

16. The method of claim 12, further comprising the computer automatically executing risk remediation with the merchant based upon the net estimated liabilities by dispatching to the merchant information regarding merchant specific reserves or one or more factors correlated with principal component values.

17. The method of claim 16, wherein the computer dispatching comprises sending an electronic message to the merchant utilizing a system selected from group consisting of an email server, a credit processing terminal, a cellphone, a personal digital assistant (PDA), and a text message server.

18. A system for quantifying merchant risk, comprising:
a. a central processor; and
b. a database containing credit-transaction-related data;
wherein the central processor is configured to:
populate the database with updated data on a daily basis based upon electronic interaction with remotely-located merchant credit terminals;
assemble data from the database in the form of a current quantitative data and historical quantitative data;
perform factor analysis on the historical quantative dataset to extract one or more principal components related to a critical variable associated with merchant credit risk;
calculate a cumulative distribution function for each of the one or more principal components comprising one or more probability values, average the principal component values, and compute a predetermined decision threshold using the historical quantitative data based on a loss function;
compute and then average the principal component probability values for a merchant utilizing the current quantative dataset; and
compare the averaged principal component probability values for the merchant with the predetermined decision threshold value to determine whether a risk management event related to the merchant should be triggered.

19. The system of claim 18, wherein the processor is further configured to utilize a preselected multiplicity of categories for the critical variable in the cumulative distribution function calculation, principal component probability value averaging, and comparison with decision threshold values.

20. The system of claim 18, wherein the processor is configured to assemble the current quantitative datasets into short and long window subsets for each merchant and historical quantative dataset into subsets associated with one or more preselected peer groups of merchants, and to perform factor analysis, calculate a cumulative distribution function, average the principal component probability values utilizing data from the current quantitative datasets, and independently for each peer group, compare with decision threshold values, utilizing data from the historical current data-subset pertinent to said peer group.

21. The system of claim 18, wherein the processor is further configured to determine a decision threshold value by performing loss function analysis on the historical data to minimize losses from false positive and false negative critical variable categorization.

22. The system of claim 18, wherein the processor is further configured to determine net estimated liabilities for the merchant by quantifying a downside liability based upon a triggered risk management event, less a merchant specific reserves amount held for such merchant.

23. The system of claim 22, wherein the processor is further configured to automatically execute risk remediation with the merchant based upon the net estimated liabilities by dispatching to the merchant information regarding merchant specific reserves or one or more factors correlated with principal component values.

24. The system of claim 23, wherein the processor is configured to dispatch information to the merchant by sending an electronic message to the merchant utilizing a system selected from group consisting of an email server, a credit processing terminal, a cellphone, a personal digital assistant (PDA), and a text message server.

25. The system of claim 22, wherein a value for total net liabilities is computed for each critical variable category, each month, to compute a measure of risk-department effectiveness using dashboard-trend-lines.

* * * * *